(12) United States Patent
Ham (10) Patent No.: US 11,618,381 B2
(45) Date of Patent: Apr. 4, 2023

(54) SAFE EXIT WARNING APPARATUS AND METHOD FOR OCCUPANT

(71) Applicants: HYUNDAI MOTOR COMPANY, Seoul (KR); KIA CORPORATION, Seoul (KR)

(72) Inventor: Seung Ju Ham, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/375,337

(22) Filed: Jul. 14, 2021

(65) Prior Publication Data
US 2022/0080887 A1  Mar. 17, 2022

(30) Foreign Application Priority Data
Sep. 15, 2020  (KR) .................. 10-2020-0118477

(51) Int. Cl.
*B60Q 9/00* (2006.01)
*G08G 1/16* (2006.01)

(52) U.S. Cl.
CPC ............. *B60Q 9/008* (2013.01); *G08G 1/167* (2013.01)

(58) Field of Classification Search
None
See application file for complete search history.

(56) References Cited

U.S. PATENT DOCUMENTS

| | | | | |
|---|---|---|---|---|
| 5,524,952 A | * | 6/1996 | Czech | B60N 2/245 296/65.12 |
| 10,657,818 B2 | * | 5/2020 | Dhull | G09F 19/18 |
| 10,769,940 B2 | * | 9/2020 | Hur | G01C 21/3438 |
| 11,077,824 B2 | * | 8/2021 | Takata | B60W 60/0015 |
| 2009/0248257 A1 | * | 10/2009 | Hoshino | B60N 2/1853 701/49 |
| 2012/0194356 A1 | * | 8/2012 | Haines | B60Q 1/324 340/933 |
| 2014/0098230 A1 | * | 4/2014 | Baur | B60R 16/0232 348/148 |
| 2014/0118130 A1 | * | 5/2014 | Chang | G08G 1/163 340/435 |
| 2017/0028907 A1 | * | 2/2017 | Chen | E05B 81/77 |
| 2017/0185763 A1 | * | 6/2017 | Jeromin | G06V 20/58 |
| 2017/0193824 A1 | * | 7/2017 | Wu | B60R 1/007 |
| 2019/0211587 A1 | * | 7/2019 | Ganeshan | E05B 77/14 |
| 2019/0265703 A1 | * | 8/2019 | Hicok | G06Q 10/02 |
| 2019/0322215 A1 | * | 10/2019 | Tsang | B60R 1/06 |
| 2019/0359130 A1 | * | 11/2019 | Fujii | B60J 5/10 |
| 2019/0385443 A1 | * | 12/2019 | Hur | B60J 5/047 |
| 2020/0047667 A1 | * | 2/2020 | Ji | B60Q 9/008 |
| 2021/0101529 A1 | * | 4/2021 | Thorngren | B60Q 1/324 |
| 2021/0122278 A1 | * | 4/2021 | Hsu | B60N 2/143 |
| 2021/0297769 A1 | * | 9/2021 | Brummer | H04S 7/302 |

* cited by examiner

*Primary Examiner* — Muhammad Adnan
(74) *Attorney, Agent, or Firm* — Morgan, Lewis & Bockius LLP (57) ABSTRACT

A safe exit warning apparatus and method for an occupant may include a first sensor that detects position of the occupant in the vehicle, a second sensor that detects an approaching object from the vehicle's blind spot, a warning device that warns the occupant about collision with the object, and a controller that determines the occupant's intent to get out of the vehicle by monitoring the position of the occupant in the vehicle when the vehicle stops and that controls the warning device to warn the occupant about the collision with the approaching object.

8 Claims, 11 Drawing Sheets

SAFE EXIT WARNING APPARATUS AND METHOD FOR OCCUPANT

CROSS-REFERENCE TO RELATED APPLICATION

The present application claims priority to Korean Patent Application No. 10-2020-0118477, filed on Sep. 15, 2020, the entire contents of which is incorporated herein for all purposes by this reference.

BACKGROUND OF THE INVENTION

Field of the Invention

The present invention relates to a technology for preventing collision of an occupant (e.g., a driver or a passenger) with an approaching vehicle (e.g., a motorcycle, a bicycle, an electric kickboard, or the like) from a vehicle's blind spot when the occupant gets out of the vehicle.

Description of Related Art

A conventional technology for assisting a vehicle occupant to safely get out of a vehicle detects whether there is an approaching vehicle from the vehicle's blind spot when the occupant is about to get out of the vehicle after the vehicle stops. When the approaching vehicle is detected, the technology maintains a door in a locked state (Child Lock) to prohibit the occupant from getting out of the vehicle, preventing collision of the occupant with the approaching vehicle.

When the approaching vehicle from the vehicle's blind spot is detected in a state in which the door is unlocked, the conventional technology outputs a warning sound after the opening of the door is detected. Therefore, the conventional technology cannot assist the occupant to safely get out of the vehicle.

That is, the conventional technology warns the occupant about collision with the approaching vehicle from the vehicle's blind spot after the occupant opens the door. Therefore, the conventional technology fails to assist the occupant to safely get out of the vehicle.

The information included in this Background of the Invention section is only for enhancement of understanding of the background of the invention and may not be taken as an acknowledgement or any form of suggestion that this information forms the prior art already known to a person skilled in the art.

BRIEF SUMMARY

Various aspects of the present invention are directed to providing a safe exit warning apparatus and method for completely preventing collision of an occupant (e.g., a driver or a passenger) with an approaching vehicle (e.g., an automobile, a motorcycle, a bicycle, an electric kickboard, or the like) from a vehicle's blind spot by monitoring the position of the occupant in the vehicle when the vehicle stops, determining the occupant's intent to get out of the vehicle, and warning the occupant about the collision with the approaching vehicle from the vehicle's blind spot.

The technical problems to be solved as various exemplary embodiments of the present invention are not limited to the aforementioned problems, and any other technical problems not mentioned herein will be clearly understood from the following description by those skilled in the art to which various exemplary embodiments of the present invention pertains. Also, it will be easily understood that the aspects and advantages of the present invention may be accomplished by the means set forth in the appended claims and combinations thereof.

According to various aspects of the present invention, a safe exit warning apparatus of an occupant includes a first sensor that detects position of the occupant in a vehicle, a second sensor that detects an approaching object from the vehicle's blind spot, a warning device that warns the occupant about collision with the object, and a controller that determines the occupant's intent to get out of the vehicle by monitoring the position of the occupant in the vehicle when the vehicle stops and that controls the warning device to warn the occupant about the collision with the approaching object.

In various exemplary embodiments of the present invention, the controller may output a warning sound through a speaker provided in a rear door of the vehicle or may apply vibration to a seat corresponding to the position of the occupant, when determining that the occupant will get out of the vehicle through the rear door of the vehicle.

In various exemplary embodiments of the present invention, the controller may increase the output of the warning sound with a decrease in separation distance from the object.

In various exemplary embodiments of the present invention, the controller may stop the output of the warning sound through the speaker provided in the rear door and may output the warning sound through a speaker provided in a front door of the vehicle, when the object deviates from a detection area of the second sensor.

In various exemplary embodiments of the present invention, the controller may set volume of the speaker provided in the front door to be the same as volume of the speaker provided in the rear door.

In various exemplary embodiments of the present invention, the safe exit warning apparatus may further include a third sensor which is mounted on a front side of the vehicle and that detects the object, and the controller may stop the output of the warning sound through the speaker provided in the front door when the object is detected by the third sensor.

According to various aspects of the present invention, a safe exit warning method for an occupant includes detecting, by a first sensor, a position of the occupant in a vehicle, detecting, by a second sensor, an approaching object from the vehicle's blind spot, determining, by a controller, the occupant's intent to get out of the vehicle, based on the position of the occupant in the vehicle when the vehicle stops, and warning, by a warning device connected to the controller, the occupant about collision of the occupant with the approaching object.

In various exemplary embodiments of the present invention, the warning of the occupant about the collision with the object may include outputting a warning sound through a speaker provided in a rear door of the vehicle or applying vibration to a seat corresponding to the position of the occupant, when determining that the occupant will get out of the vehicle through the rear door of the vehicle.

In various exemplary embodiments of the present invention, the warning of the occupant about the collision with the object may further include increasing the output of the warning sound with a decrease in separation distance from the object.

In various exemplary embodiments of the present invention, the warning of the occupant about the collision with the object may further include stopping the output of the warning sound through the speaker provided in the rear door and outputting the warning sound through a speaker provided in a front door of the vehicle, when the object deviates from a detection area of the second sensor.

In various exemplary embodiments of the present invention, the warning of the occupant about the collision with the object may further include setting volume of the speaker provided in the front door to be the same as volume of the speaker provided in the rear door.

In various exemplary embodiments of the present invention, the warning of the occupant about the collision with the object may further include stopping the output of the warning sound through the speaker provided in the front door when the object is detected by a third sensor mounted on a front side of the vehicle.

According to various aspects of the present invention, a safe exit warning apparatus of an occupant includes a first sensor that detects an approaching object from a vehicle's blind spot, a second sensor that detects opening of a door of the vehicle, a warning device that warns the occupant about collision with the object, and a controller that is configured to control the warning device to warn the occupant about the collision with the object, when determining that the opening of the door of the vehicle is detected in a stop state of the vehicle.

In various exemplary embodiments of the present invention, the warning device may include a plurality of vibration devices that apply vibration to a driver's seat, a front passenger seat, a rear left seat, and a rear right seat of the vehicle.

In various exemplary embodiments of the present invention, the controller may be configured to control the warning device to apply vibration to a seat adjacent to the open door.

In various exemplary embodiments of the present invention, the warning device may include a cluster that displays an image taken with a camera mounted on a left side mirror of the vehicle.

In various exemplary embodiments of the present invention, the controller may be configured to control the warning device such that the image taken with the camera is displayed on the cluster.

According to various aspects of the present invention, a safe exit warning method for an occupant includes detecting, by a first sensor, an approaching object from a vehicle's blind spot, detecting, by a second sensor, opening of a door of the vehicle, and warning, by a warning device connected to the controller, the occupant about collision with the object, when determining that the opening of the door of the vehicle is detected in a stop state of the vehicle.

In various exemplary embodiments of the present invention, the warning of the occupant about the collision with the object may include applying vibration to a seat adjacent to the open door.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Hereinafter, various exemplary embodiments of the present invention will be described in detail with reference to the exemplary drawings. In adding the reference numerals to the components of each drawing, it may be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those understood by those skilled in the art to which various exemplary embodiments of the present invention pertains. Such terms as those defined in a used dictionary are to be interpreted as having meanings equal to the contextual meanings in the relevant field of art, and are not to be interpreted as having ideal or excessively formal meanings unless clearly defined as having such in the present application.

Figure 1:
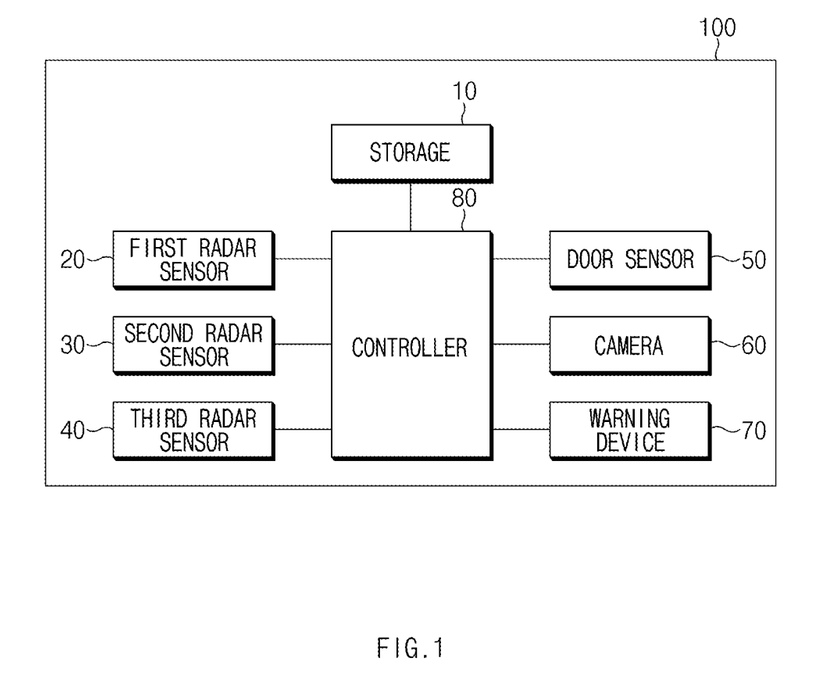
FIG. 1 is a view exemplarily illustrating a configuration of a safe exit warning apparatus of an occupant according to various exemplary embodiments of the present invention.

FIG. 1 is a view exemplarily illustrating a configuration of a safe exit warning apparatus of an occupant according to various exemplary embodiments of the present invention.

As illustrated in FIG. 1, the safe exit warning apparatus 100 for the occupant according to the exemplary embodiment of the present invention may include a storage 10, a first radar sensor 20, a second radar sensor 30, a third radar sensor 40, a door sensor 50, a camera 60, a warning device 70, and a controller 80. Depending on a way of carrying out the safe exit warning apparatus 100 for the occupant according to the exemplary embodiment of the present invention, the components may be combined together to form one entity or some of the components may be omitted.

The storage 10 may store various logics, algorithms, and programs required in a process of monitoring the position of the occupant (e.g., a driver or a passenger) in a vehicle when the vehicle stops, determining the occupant's intent to get out of the vehicle, and warning the occupant about collision with an approaching vehicle (e.g., a vehicle, a motorcycle, a bicycle, an electric kickboard, or the like) from the vehicle's blind spot.

The storage 10 may include at least one type of storage medium among memories of a flash memory type, a hard disk type, a micro type, and a card type (e.g., a Secure Digital (SD) card or an eXtream Digital (XD) card) and memories of a Random Access Memory (RAM) type, a Static RAM (SRAM) type, a Read-Only Memory (ROM) type, a Programmable ROM (PROM) type, an Electrically Erasable PROM (EEPROM) type, a Magnetic RAM (MRAM) type, a magnetic disk type, and an optical disk type.

The first radar sensor 20 may be mounted in the interior of the vehicle and may detect the position of the occupant. The first radar sensor 20 may be replaced with a first LiDAR sensor.

Hereinafter, a process of detecting, by the first radar sensor 20, the position of the occupant will be described with reference to FIG. 2, FIG. 3 and FIG. 4.

Figure 2:
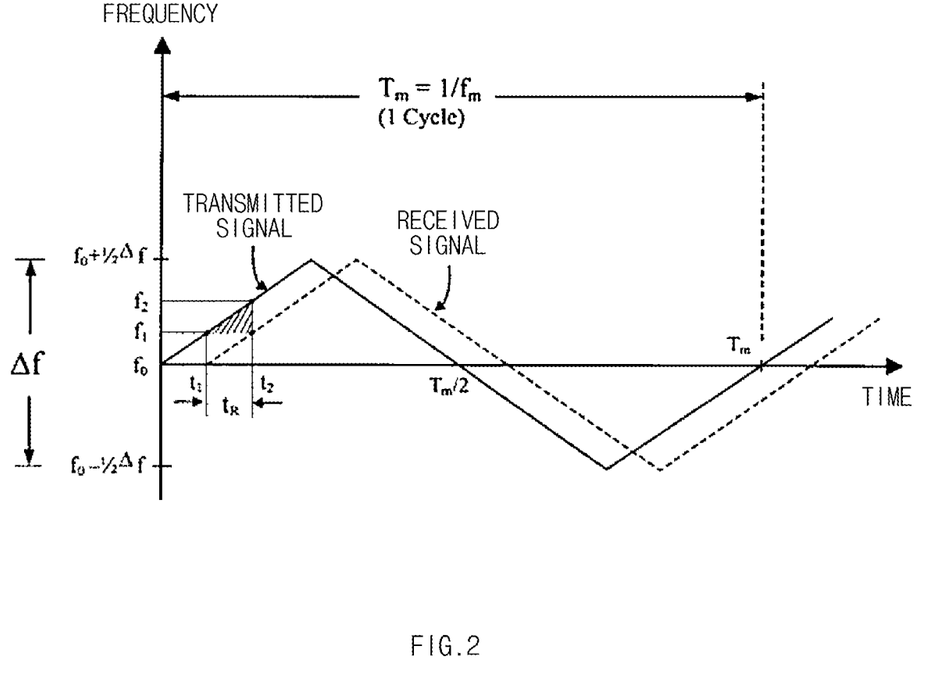
FIG. 2 is an exemplary view exemplarily illustrating an operating principle of a first radar sensor provided in the safe exit warning apparatus of the occupant according to various exemplary embodiments of the present invention.

FIG. 2 is an exemplary view exemplarily illustrating an operating principle of the first radar sensor provided in the safe exit warning apparatus of the occupant according to various exemplary embodiments of the present invention.

As illustrated in FIG. 2, the first radar sensor 20 provided in the safe exit warning apparatus of the occupant according to the exemplary embodiment of the present invention may linearly change a frequency with time and may identify time information based on a frequency difference of a reflected wave (Frequency Modulated Continuous Wave (FMCW)).

When a transmitter Tx of the first radar sensor 20 radiates an electromagnetic wave having a frequency of $f_1$ at time $t_1$ and a receiver Rx of the first radar sensor 20 receives the electromagnetic wave having the frequency of $f_1$, the time it takes the electromagnetic wave to reach an object and return may be known.

In FIG. 2, a difference ($f_R=f_2-f_1$) between the frequency of a signal transmitted at time $t_2$ and the frequency of a signal received at time $t_2$ may be known, and the change rate of frequency ($2\times\Delta f/T_m$) and the frequency modulation rate ($f_m=1/T_m$) for time $t_m$ may be known.

Accordingly, the distance R from the object may be provided by Equation 1 below.

$$R = \frac{cf_R}{4\times\Delta f \times f_m} \quad \text{[Equation 1]}$$

Here, $f_m$ is the frequency modulation rate, $\Delta f$ is a constant value representing a frequency modulation range, $f_R$ is the difference between the frequency of the transmitted signal and the frequency of the received signal, and C is the speed of light.

Figure 3:
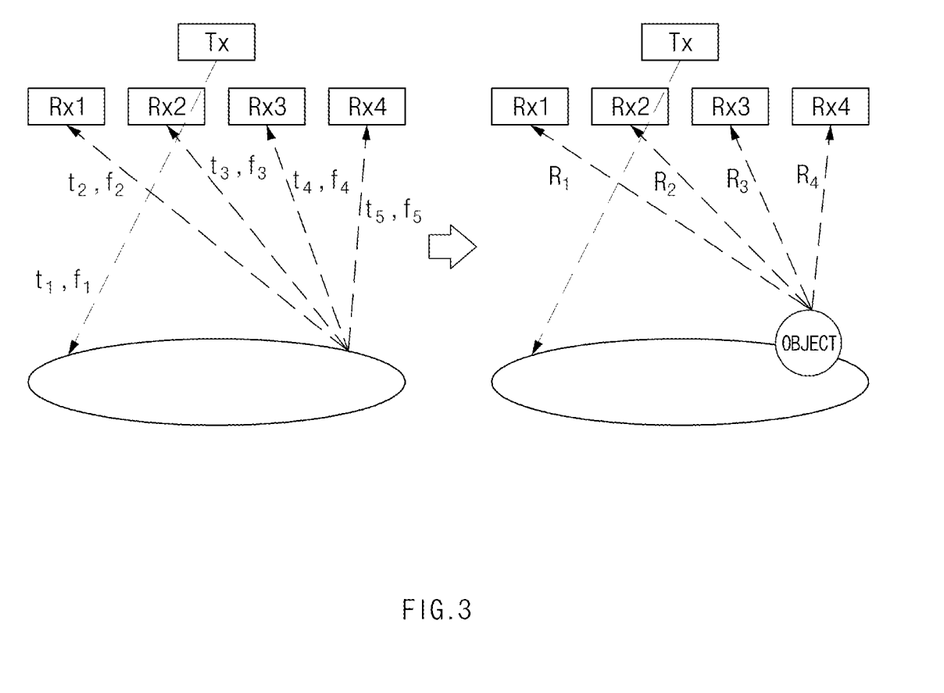
FIG. 3 is a view exemplarily illustrating the structure of the first radar sensor provided in the safe exit warning apparatus of the occupant according to various exemplary embodiments of the present invention.

FIG. 3 is a view exemplarily illustrating the structure of the first radar sensor provided in the safe exit warning apparatus of the occupant according to various exemplary embodiments of the present invention.

As illustrated in FIG. 3, the first radar sensor 20 may include, for example, one transmitter Tx and four receivers Rx1, Rx2, Rx3, and Rx4. The interval between the four receivers Rx1, Rx2, Rx3, and Rx4 may be set depending on a designer's intent.

In FIG. 3, $f_1$ refers to the frequency of a transmitted signal, $t_1$ refers to the transmission time of the transmitted signal, $f_2$ refers to the frequency of a received signal, $t_2$ refers to the reception time of the received signal, $f_3$ refers to the frequency of a received signal, $t_3$ refers to the reception time of the received signal, $f_4$ refers to the frequency of a received signal, $t_4$ refers to the reception time of the received signal, $f_5$ refers to the frequency of a received signal, and is refers to the reception time of the received signal.

Accordingly, the first radar sensor 20 may detect the distance R1 from an object which is determined based on the first receiver Rx1, the distance R2 from the object which is determined based on the second receiver Rx2, the distance R3 from the object which is determined based on the third receiver Rx3, and the distance R4 from the object which is determined based on the fourth receiver Rx4.

Figure 4:
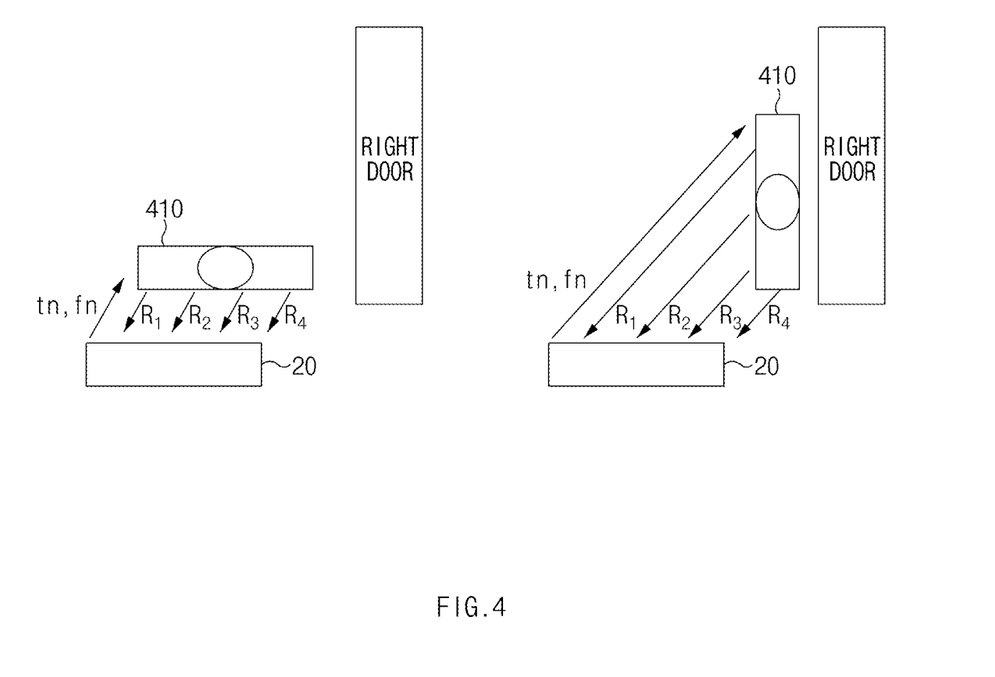
FIG. 4 is an exemplary view exemplarily illustrating a process of detecting the position of the occupant by the first radar sensor provided in the safe exit warning apparatus of the occupant according to various exemplary embodiments of the present invention.

FIG. 4 is an exemplary view exemplarily illustrating a process of detecting the position of the occupant by the first radar sensor provided in the safe exit warning apparatus of the occupant according to various exemplary embodiments of the present invention.

As illustrated in FIG. 4, when a vehicle occupant 410 normally sits on a seat, the receivers of the first radar sensor 20 detect the same distances $R_1$, $R_2$, $R_3$, and $R_4$. However, when the vehicle occupant 410 turns his or her body toward a right door to get out of the vehicle, the receivers of the first radar sensor 20 detect different distances $R_1$, $R_2$, $R_3$, and $R_4$.

Accordingly, the controller 80 may determine the occupant's intent to get out of the vehicle, based on the separation distance between each of the receivers of the first radar sensor 20 and the occupant.

Returning to FIG. 1, the second radar sensor 30 may be mounted at the rear of the vehicle and may detect not only the approaching vehicle from the vehicle's blind spot but also the separation distance from the approaching vehicle. The second radar sensor 30 may be replaced with a second LiDAR sensor.

The third radar sensor 40 may be mounted on a front side (e.g., a front right side and a front left side) of the vehicle and may detect not only the approaching vehicle beyond a detection range of the second radar sensor 30 but also the separation distance from the approaching vehicle. The third radar sensor 30 may be replaced with a third LiDAR sensor.

The door sensor 50 may be implemented with a door latch and may detect whether each door of the vehicle is open or closed.

The camera 60 may be a camera provided in the vehicle. For example, the camera 60 may be mounted on lower end portions of left/right side mirrors.

Figure 5:
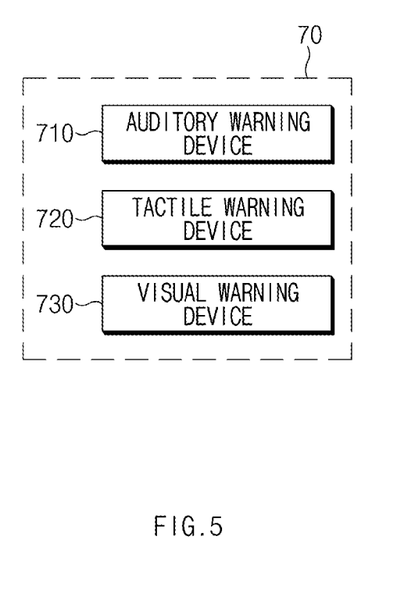
FIG. 5 is a view exemplarily illustrating a detailed configuration of a warning device provided in the safe exit warning apparatus of the occupant according to various exemplary embodiments of the present invention.

The warning device 70 may be a module that warns the occupant (e.g., a driver or a passenger) about collision with the approaching vehicle from the vehicle's blind spot. As illustrated in FIG. 5, the warning device 70 may include an auditory warning device 710, a tactile warning device 720, and a visual warning device 730.

Hereinafter, a configuration of the warning device 70 will be described in detail with reference to FIGS. 6 to 8.

Figure 6:
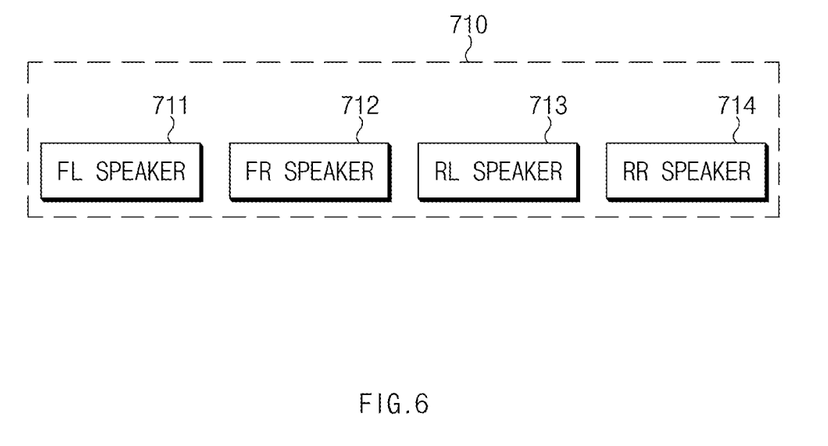
FIG. 6 is a view exemplarily illustrating a detailed configuration of an auditory warning device provided in the safe exit warning apparatus of the occupant according to various exemplary embodiments of the present invention.

FIG. 6 is a view exemplarily illustrating a detailed configuration of the auditory warning device provided in the safe exit warning apparatus of the occupant according to various exemplary embodiments of the present invention.

As illustrated in FIG. 6, the auditory warning device 710 provided in the safe exit warning apparatus of the occupant according to the exemplary embodiment of the present invention may include a Front Left (FL) speaker 711, a Front Right (FR) speaker 712, a Rear Left (RL) speaker 713, and a Rear Right (RR) speaker 714.

Figure 7:
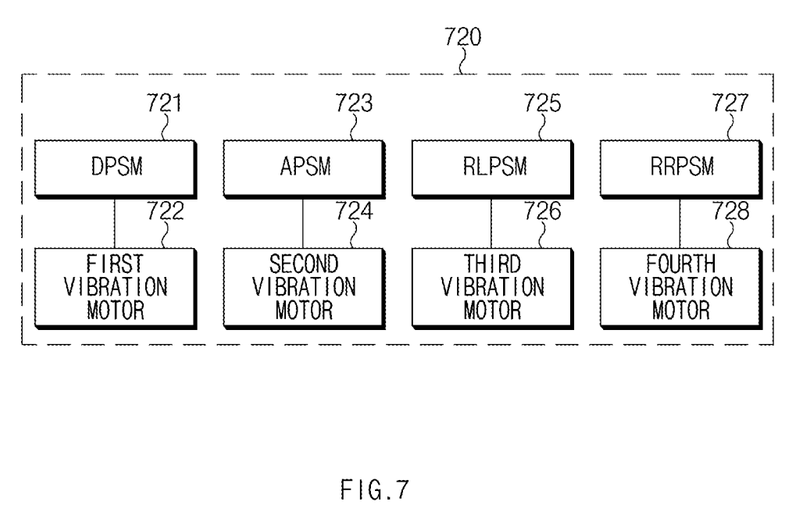
FIG. 7 is a view exemplarily illustrating a detailed configuration of a tactile warning device provided in the safe exit warning apparatus of the occupant according to various exemplary embodiments of the present invention.

FIG. 7 is a view exemplarily illustrating a detailed configuration of the tactile warning device provided in the safe exit warning apparatus of the occupant according to various exemplary embodiments of the present invention.

As illustrated in FIG. 7, the tactile warning device 720 provided in the safe exit warning apparatus of the occupant according to the exemplary embodiment of the present invention may include a Driver Power Seat Module (DPSM) 721, a first vibration motor 722, an Assist Power Seat Module (APSM) 723, a second vibration motor 724, a Rear Left Power Seat Module (RLPSM) 725, a third vibration motor 726, a Rear Right Power Seat Module (RRPSM) 727, and a fourth vibration motor 728. The DPSM 721 and the first vibration motor 722 may be referred to as a first vibration device. The APSM 723 and the second vibration motor 724 may be referred to as a second vibration device. The RLPSM 725 and the third vibration motor 726 may be referred to as a third vibration device. The RRPSM 727 and the fourth vibration motor 728 may be referred to as a fourth vibration device.

The DPSM 721 may not only adjust the position and angle of the driver's seat, but may also drive the first vibration motor 722 provided in the driver's seat.

The APSM 723 may not only adjust the position and angle of the front passenger seat, but may also drive the second vibration motor 724 provided in the front passenger seat.

The RLPSM 725 may not only adjust the position and angle of the rear left seat, but may also drive the first vibration motor 726 provided in the rear left seat.

The RRPSM 727 may not only adjust the position and angle of the rear right seat, but may also drive the fourth vibration motor 728 provided in the rear right seat.

Figure 8:
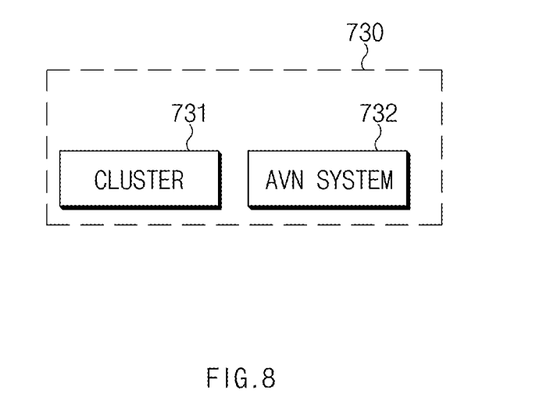
FIG. 8 is a view exemplarily illustrating a detailed configuration of a visual warning device provided in the safe exit warning apparatus of the occupant according to various exemplary embodiments of the present invention.

FIG. 8 is a view exemplarily illustrating a detailed configuration of the visual warning device provided in the safe exit warning apparatus of the occupant according to various exemplary embodiments of the present invention.

As illustrated in FIG. 8, the visual warning device 730 provided in the safe exit warning apparatus of the occupant according to the exemplary embodiment of the present invention may include a cluster 731 and an Audio Video Navigation (AVN) system 732.

The cluster 731 may be a digital display. The cluster 731 may display various pieces of information. The cluster 731 may display, in real time, images taken with the camera 60.

The AVN system 732 may display, in real time, the images taken with the camera 60.

Returning to FIG. 1, the controller 80 performs overall control to enable the components to perform functions thereof normally. The controller 80 may be implemented in a form of hardware or software, or in a combination thereof. The controller 80 may preferably be implemented with, but is not limited to, a microprocessor.

The controller 80 may perform various controls in a process of monitoring the position of the occupant (e.g., a driver or a passenger) in the vehicle when the vehicle stops, determining the occupant's intent to get out of the vehicle, and warning the occupant about collision with the approaching vehicle (e.g., an automobile, a motorcycle, a bicycle, an electric kickboard, or the like) from the vehicle's blind spot.

The controller 80 may determine whether the vehicle stops, based on various pieces of information obtained through a vehicle network. The vehicle network may include a Controller Area Network (CAN), a Controller Area Network with Flexible Data-rate (CAN FD), a Local Interconnect Network (LIN), FlexRay, Media Oriented Systems Transport (MOST), Ethernet, or the like.

When the controller 80 determines the occupant's intent to get out of the vehicle by monitoring the position of the occupant in the vehicle in a stop state of the vehicle, the controller 80 may acoustically warn the occupant about collision with the approaching vehicle from the vehicle's blind spot. At the instant time, the controller 80 may provide a warning in a tactile manner.

For example, the controller 80 may output a warning sound through a speaker located in the right door, when determining that the occupant in the vehicle will get out of the vehicle through the right door. The controller 80 may output the warning sound through the RR speaker 714, when determining that the occupant in the vehicle will get out of the vehicle through a Rear Right (RR) door.

In a process of outputting the warning sound, the controller 80 may adjust the volume of the warning sound, based on a radar response frequency (Doppler Effect) that varies depending on the separation distance from the approaching vehicle from the vehicle's blind spot. At the instant time, the controller 80 may increase the output of the warning sound with a decrease in the separation distance.

Furthermore, the controller 80 may allow the FR speaker 712 instead of the RR speaker 714 to output the warning sound at the time when the approaching vehicle from the vehicle's blind spot deviates from a detection area of the second radar sensor 30. At the instant time, the controller 80 may set the volume of the FR speaker 712 to be the same as the volume of the RR speaker 714. Thereafter, the controller 80 may stop the output of the warning sound through the FR speaker 712 when the approaching vehicle from the vehicle's blind spot is detected by the third radar sensor 40.

Meanwhile, when the opening of a door is detected by the door sensor 50 in a stop state of the vehicle, the controller 80 may warn the occupant about collision with the approaching vehicle from the vehicle's blind spot in a tactile manner. At the instant time, the controller 80 may acoustically warn the occupant about the collision.

For example, the controller 80 may drive the fourth vibration motor 728 through the RRPSM 727 when determining that the occupant in the vehicle will get out of the vehicle through the RR door.

In another example, when determining that the occupant in the vehicle will get out of the vehicle through the RR door, the controller 80 may perform control such that the DPSM 721 drives the first vibration motor 722, the APSM 723 drives the second vibration motor 724, the RLPSM 725 drives the third vibration motor 726, and the RRPSM 727 drives the fourth vibration motor 728.

In another example, when detecting the opening of a Front Right (FR) door through the door sensor 50, the controller 80 may perform control such that the APSM 723 drives the second vibration motor 724.

Meanwhile, when the opening of a door is detected by the door sensor 50 in a stop state of the vehicle, the controller 80 may visually warn the occupant about collision with the approaching vehicle from the vehicle's blind spot.

For example, when detecting the opening of a Front Left (FL) door through the door sensor 50, the controller 80 may perform control such that an image taken with the camera 60 mounted on an FL side mirror is displayed on the cluster 731. The controller 80 may stop displaying the image on the cluster 731 when the rear end portion of the approaching vehicle from the vehicle's blind spot is detected by the third radar sensor 40 mounted on the front left side of the vehicle.

Figure 9:
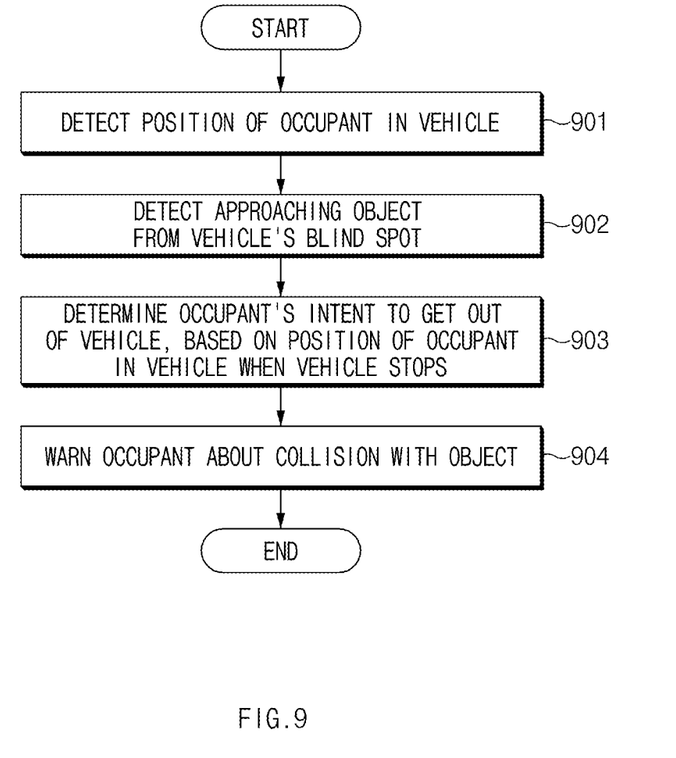
FIG. 9 is a flowchart illustrating a safe exit warning method for an occupant according to various exemplary embodiments of the present invention.

FIG. 9 is a flowchart illustrating a safe exit warning method for an occupant according to various exemplary embodiments of the present invention.

First, the first radar sensor 20 detects the position of the occupant in the vehicle (901).

Next, the second radar sensor 30 detects an approaching object from the vehicle's blind spot (902).

Accordingly, the controller 80 determines the occupant's intent to get out of the vehicle, based on the position of the occupant in the vehicle when the vehicle stops (903).

After that, the warning device 70 warns the occupant about collision with the object (904).

Figure 10:
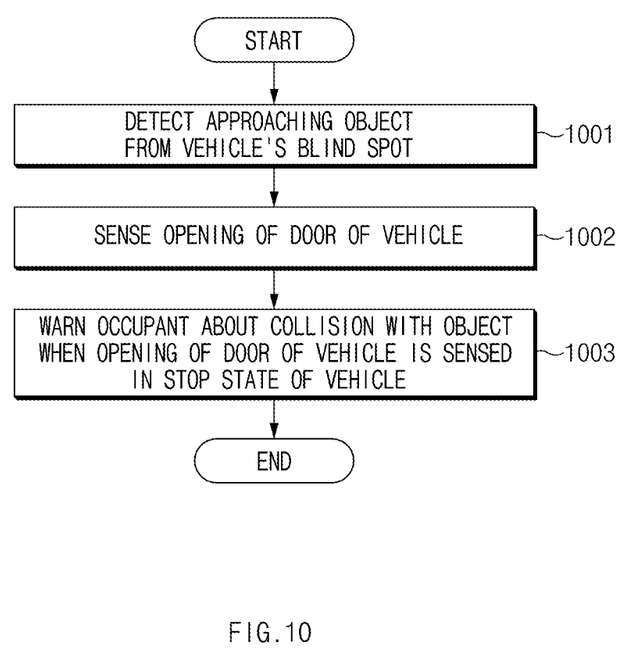
FIG. 10 is a flowchart illustrating a safe exit warning method for an occupant according to various exemplary embodiments of the present invention.

FIG. 10 is a flowchart illustrating a safe exit warning method for an occupant according to various exemplary embodiments of the present invention.

First, the second radar sensor 30 detects an approaching object from the vehicle's blind spot (1001).

Next, the door sensor 50 detects the opening of a door of the vehicle (1002).

Accordingly, when the opening of the door of the vehicle is detected in a stop state of the vehicle, the controller 80 performs control such that the warning device 70 warns the occupant about collision with the object (1003).

Figure 11:
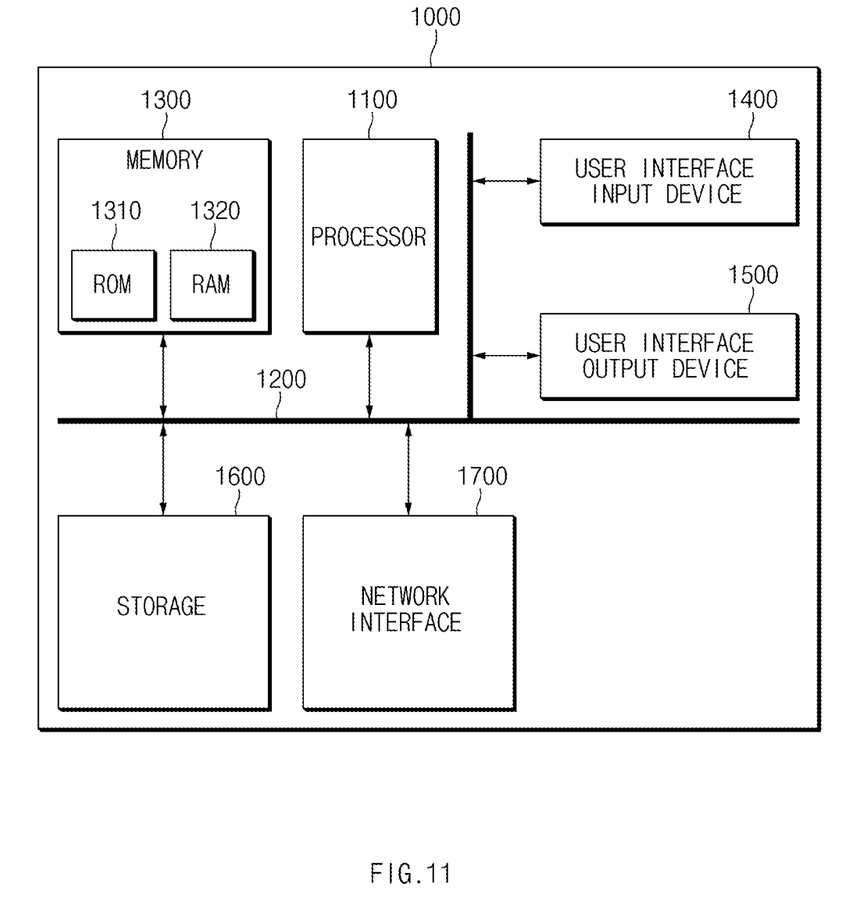
FIG. 11 is a block diagram illustrating a computing system for executing the safe exit warning methods according to the exemplary embodiments of the present invention.

FIG. 11 is a block diagram illustrating a computing system for executing the safe exit warning methods according to the exemplary embodiments of the present invention.

Referring to FIG. 11, the safe exit warning methods according to the exemplary embodiments of the present invention may be implemented through the computing system. The computing system 1000 may include at least one processor 1100, a memory 1300, a user interface input device 1400, a user interface output device 1500, storage 1600, and a network interface 1700, which are connected to each other via a system bus 1200.

The processor 1100 may be a Central Processing Unit (CPU) or a semiconductor device that processes instructions stored in the memory 1300 or the storage 1600. The memory 1300 and the storage 1600 may include various types of volatile or non-volatile storage media. For example, the memory 1300 may include a Read Only Memory (ROM) 1310 and a Random Access Memory (RAM) 1320.

Thus, the operations of the method or the algorithm described in connection with the exemplary embodiments included herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, or a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an Application Specific Integrated Circuit (ASIC). The ASIC may reside within a user terminal. In another case, the processor 1100 and the storage medium may reside in the user terminal as separate components.

As described above, the safe exit warning apparatus and method according to the exemplary embodiments of the present invention monitors the position of the occupant (e.g., a driver or a passenger) in the vehicle when the vehicle stops, determines the occupant's intent to get out of the vehicle, and warns the occupant about collision with the approaching vehicle (e.g., an automobile, a motorcycle, a bicycle, an electric kickboard, or the like) from the vehicle's blind spot, completely preventing collision of the occupant with the approaching vehicle from the vehicle's blind spot.

Hereinabove, although the present invention has been described with reference to exemplary embodiments and the accompanying drawings, the present invention is not limited thereto, but may be variously modified and altered by those skilled in the art to which various exemplary embodiments of the present invention pertains without departing from the spirit and scope of the present invention claimed in the following claims.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A safe exit warning apparatus of an occupant, the safe exit warning apparatus comprising:
    a first sensor configured to detect a position of the occupant in a vehicle;
    a second sensor configured to detect an approaching object from a blind spot of the vehicle;
    a warning device configured to warn the occupant about collision of the occupant with the approaching object; and
    a controller connected to the warning device and configured to determine the occupant's intent to get out of the vehicle by monitoring the position of the occupant in the vehicle when the vehicle stops and to control the warning device to warn the occupant about the collision with the approaching object,
    wherein the controller is configured to determine the occupant's intent to get out of the vehicle when it is detected by the first sensor that body of the occupant faces a door of the vehicle,
    wherein the controller is configured to output a warning sound through a speaker provided in it is detected by the first sensors that rear door of the vehicle or to apply vibration to a seat corresponding to the position of the occupant, when determining that the occupant will get out of the vehicle through the rear door of the vehicle, and
    wherein the controller is configured to stop an output of the warning sound through the speaker provided in the rear door and to output the warning sound through a speaker provided in a front door of the vehicle, upon determining that the approaching object deviates from a detection area of the second sensor.

2. The safe exit warning apparatus of claim 1, wherein the controller is further configured to increase an output of the warning sound with a decrease in separation distance between the blind spot and the approaching object.

3. The safe exit warning apparatus of claim 1, wherein the controller is further configured to set volume amount of the speaker provided in the front door to be a same as volume amount which was set when the speaker provided in the rear door was operated.

4. The safe exit warning apparatus of claim 1, further including:
    a third sensor mounted on a front side of the vehicle and configured to detect the approaching object,
    wherein the controller is configured to stop the output of the warning sound through the speaker provided in the front door when the approaching object is detected by the third sensor.

5. A safe exit warning method for an occupant, the safe exit warning method comprising:
    detecting, by a first sensor, a position of the occupant in a vehicle;
    detecting, by a second sensor, an approaching object from a blind spot of the vehicle;
    determining, by a controller, the occupant's intent to get out of the vehicle, according to the position of the occupant in the vehicle when the vehicle stops; and
    warning, by a warning device connected to the controller, the occupant about collision of the occupant with the approaching object,
    wherein the determining, by the controller, the occupant's intent to get out of the vehicle includes determining the occupant's intent to get out of the vehicle when it is detected by the first sensor that body of the occupant faces a door of the vehicle, and
    wherein the warning, by the warning device connected to the controller, the occupant about the collision of the occupant with the approaching object includes:
    outputting a warning sound through a speaker provided in a rear door of the vehicle or applying vibration to it is detected by the first sensors that seat corresponding to the position of the occupant, when the controller determines that the occupant will get out of the vehicle through the rear door of the vehicle; and
    stopping the output of the warning sound through the speaker provided in the rear door and outputting the warning sound through a speaker provided in a front door of the vehicle, upon determining that the approaching object deviates from a detection area of the second sensor.

6. The safe exit warning method of claim 5, wherein the warning, by the warning device connected to the controller, the occupant about the collision of the occupant with the approaching object further includes:
    increasing an output of the warning sound with a decrease in separation distance between the blind spot and the approaching object.

7. The safe exit warning method of claim 5, wherein the warning, by the warning device connected to the controller, the occupant about the collision of the occupant with the approaching object further includes:
    setting volume amount of the speaker provided in the front door to be a same as volume amount which was set when the speaker provided in the rear door was operated.

8. The safe exit warning method of claim 5, wherein the warning, by the warning device connected to the controller, the occupant about the collision of the occupant with the approaching object further includes:
    stopping the output of the warning sound through the speaker provided in the front door when the approaching object is detected by a third sensor mounted on a front side of the vehicle.

* * * * *